(12) United States Patent
Naqvi

(10) Patent No.: US 11,073,960 B2
(45) Date of Patent: Jul. 27, 2021

(54) METHOD AND SYSTEM FOR CREATING ADAPTIVE USER INTERFACES USING USER PROVIDED AND CONTROLLED DATA

(71) Applicant: Sensoriant, Inc., Cedar Knolls, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 0 days.

(21) Appl. No.: 15/742,985

(22) PCT Filed: Jul. 11, 2016

(86) PCT No.: PCT/US2016/041813
§ 371 (c)(1),
(2) Date: Jan. 9, 2018

(87) PCT Pub. No.: WO2017/008084
PCT Pub. Date: Jan. 12, 2017

(65) Prior Publication Data
US 2018/0225008 A1 Aug. 9, 2018

Related U.S. Application Data

(60) Provisional application No. 62/190,458, filed on Jul. 9, 2015, provisional application No. 62/321,405, filed on Apr. 12, 2016.

(51) Int. Cl.
*G06F 3/0481* (2013.01)
*H04L 9/32* (2006.01)
(Continued)

(52) U.S. Cl.
CPC ............ *G06F 3/0481* (2013.01); *G06F 21/31* (2013.01); *G06F 21/629* (2013.01);
(Continued)

(58) Field of Classification Search
CPC ....... G06F 2203/011; G06F 2221/2105; G06F 2221/2137; G06F 2221/2141;
(Continued)

(56) References Cited

U.S. PATENT DOCUMENTS 7,315,826 B1 1/2008 Guheen et al.
7,810,153 B2 10/2010 Perlin et al.
(Continued)

FOREIGN PATENT DOCUMENTS

WO 2011/161303 A1 12/2011

OTHER PUBLICATIONS

Lazarovich, Amir. Invisible Ink: blockchain for data privacy. Diss. Massachusetts Institute of Technology, 2015. (Year: 2015).*

*Primary Examiner* — Madhuri R Herzog
(74) *Attorney, Agent, or Firm* — Mayer & Williams, PC; Stuart H. Mayer

(57) ABSTRACT

A method for customizing an application for a user includes receiving user state information about a user of a smart device from one or more sensors associated with the smart device. The user state information is stored using an access control mechanism that only allows access upon express authorization of the user. The stored user state information is retrieved after an application being executed on or through the smart device has been provided with the express authorization from the user. Functionality of the application is adapted based at least in part on the user state information that is retrieved.

21 Claims, 5 Drawing Sheets

(51) Int. Cl.
  *G06F 21/62* (2013.01)
  *G06F 21/31* (2013.01)
  *G06Q 50/00* (2012.01)
  *H04L 12/58* (2006.01)
(52) U.S. Cl.
  CPC ...... *G06F 21/6218* (2013.01); *G06F 21/6245* (2013.01); *G06Q 50/01* (2013.01); *H04L 9/32* (2013.01); *H04L 51/043* (2013.01); *G06F 2203/011* (2013.01); *G06F 2221/2105* (2013.01)
(58) Field of Classification Search
  CPC ..... G06F 3/048–3/04897; G06F 21/30–21/36; G06F 21/60–21/645; G06Q 50/01; H04L 9/32; H04L 51/043
  See application file for complete search history.

(56) References Cited

U.S. PATENT DOCUMENTS

| | | | | |
|---|---|---|---|---|
| 8,683,348 | B1* | 3/2014 | Blank | G06F 3/011 715/709 |
| 8,688,726 | B2 | 4/2014 | Mahajan | |
| 8,826,013 | B1 | 9/2014 | Kodukula | |
| 9,015,807 | B2* | 4/2015 | Howard | G06F 21/62 726/4 |
| 2001/0020228 | A1* | 9/2001 | Cantu | H04L 9/3213 705/50 |
| 2004/0073490 | A1 | 4/2004 | Shah | |
| 2006/0036751 | A1 | 2/2006 | Garbow | |
| 2006/0178918 | A1 | 8/2006 | Mikurak | |
| 2007/0061198 | A1 | 3/2007 | Ramer | |
| 2007/0061244 | A1 | 3/2007 | Ramer | |
| 2007/0061245 | A1 | 3/2007 | Ramer | |
| 2007/0073717 | A1 | 3/2007 | Ramer | |
| 2007/0073718 | A1 | 3/2007 | Ramer | |
| 2007/0073719 | A1 | 3/2007 | Ramer | |
| 2007/0171921 | A1 | 7/2007 | Wookey et al. | |
| 2007/0198485 | A1 | 8/2007 | Ramer | |
| 2007/0198656 | A1 | 8/2007 | Mazzaferri | |
| 2008/0256054 | A1 | 10/2008 | Saaty | |
| 2009/0300635 | A1 | 12/2009 | Ferris | |
| 2010/0121705 | A1 | 5/2010 | Ramer | |
| 2010/0199098 | A1 | 8/2010 | King | |
| 2011/0145076 | A1 | 6/2011 | Ramer | |
| 2012/0214444 | A1* | 8/2012 | McBride | H04W 12/0605 455/411 |
| 2012/0265811 | A1 | 10/2012 | Bist | |
| 2012/0284256 | A1 | 11/2012 | Mahajan | |
| 2012/0289788 | A1 | 11/2012 | Jain et al. | |
| 2013/0024492 | A1 | 1/2013 | Graff et al. | |
| 2013/0152000 | A1* | 6/2013 | Liu | G06F 9/44 715/765 |
| 2013/0317950 | A1 | 11/2013 | Abraham | |
| 2014/0089243 | A1 | 3/2014 | Oppenheimer | |
| 2014/0129942 | A1 | 5/2014 | Rathod | |
| 2014/0200991 | A1 | 7/2014 | Wu | |
| 2015/0039420 | A1 | 2/2015 | Rao | |
| 2015/0127940 | A1 | 5/2015 | Polehn | |
| 2015/0178511 | A1 | 6/2015 | Klappert | |
| 2015/0310020 | A1 | 10/2015 | Brav | |
| 2017/0070778 | A1* | 3/2017 | Zerlan | H04N 21/4408 |
| 2018/0225469 | A1* | 8/2018 | Daniel | G06F 21/10 |
| 2018/0241551 | A1* | 8/2018 | Fujimura | G06F 21/10 |
| 2019/0149337 | A1* | 5/2019 | Savanah | H04L 9/3239 713/168 |

* cited by examiner

METHOD AND SYSTEM FOR CREATING ADAPTIVE USER INTERFACES USING USER PROVIDED AND CONTROLLED DATA

BACKGROUND

The idea of personalization of services is common in web applications. Data is derived from a number of sources and is used to personalize services to users. For example, many websites store historical records of user search or shopping requests to determine what users like in given situations. Such information may then be used to provide product recommendations, advertisements, or coupons to users who access the websites.

Crafting a pleasant and useful user experience by utilizing a user's data is prevalent amongst many service providers today and is in common use; its commercial importance is well recognized.

For example, when a user visits a website, the user's browser accesses a cookie, stored in the user's device, which has data pertaining to previous visits of the user. This data allows the website to associate the visiting user with his prior historical usage and data. Using the cookie data, the website may adapt its contents and messages accordingly. For example, a user visiting a website may be shown advertisements from a (different) previously visited website. Alternatively, he may be shown advertisements related to his previous visit to the same website. A common use is to save user passwords in the cookie and present them to the user to initiate a session, thus obviating the need on the part of the user having to type his password to authenticate himself.

While users prefer personalized services and may find them useful or time-saving, there is wide spread concern that service providers may be storing personal information and invading user's privacy. An example is provided by search requests that may be used by a website to guess personal information about a user. Past purchases may reveal personal information, e.g., purchase decisions concerning certain items or medications may indicate a user's health condition. Many websites have also been the subject of privacy attacks wherein users' personal data, such as social security numbers, have been stolen.

SUMMARY

In one aspect, the present invention provides a method for customizing an application for a user. In accordance with the method, user state information about a user of a smart device is received from one or more sensors associated with a smart device. The user state information is stored using an access control mechanism that only allows access upon express authorization of the user. The stored user state information is retrieved after an application being executed on or through the smart device has been provided with the express authorization from the user. Functionality of the application is adapted based at least in part on the user state information that is retrieved.

In one particular implementation, the functionality of the application that is being adapted is functionality associated with the user interface of the application.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

Figure 1:
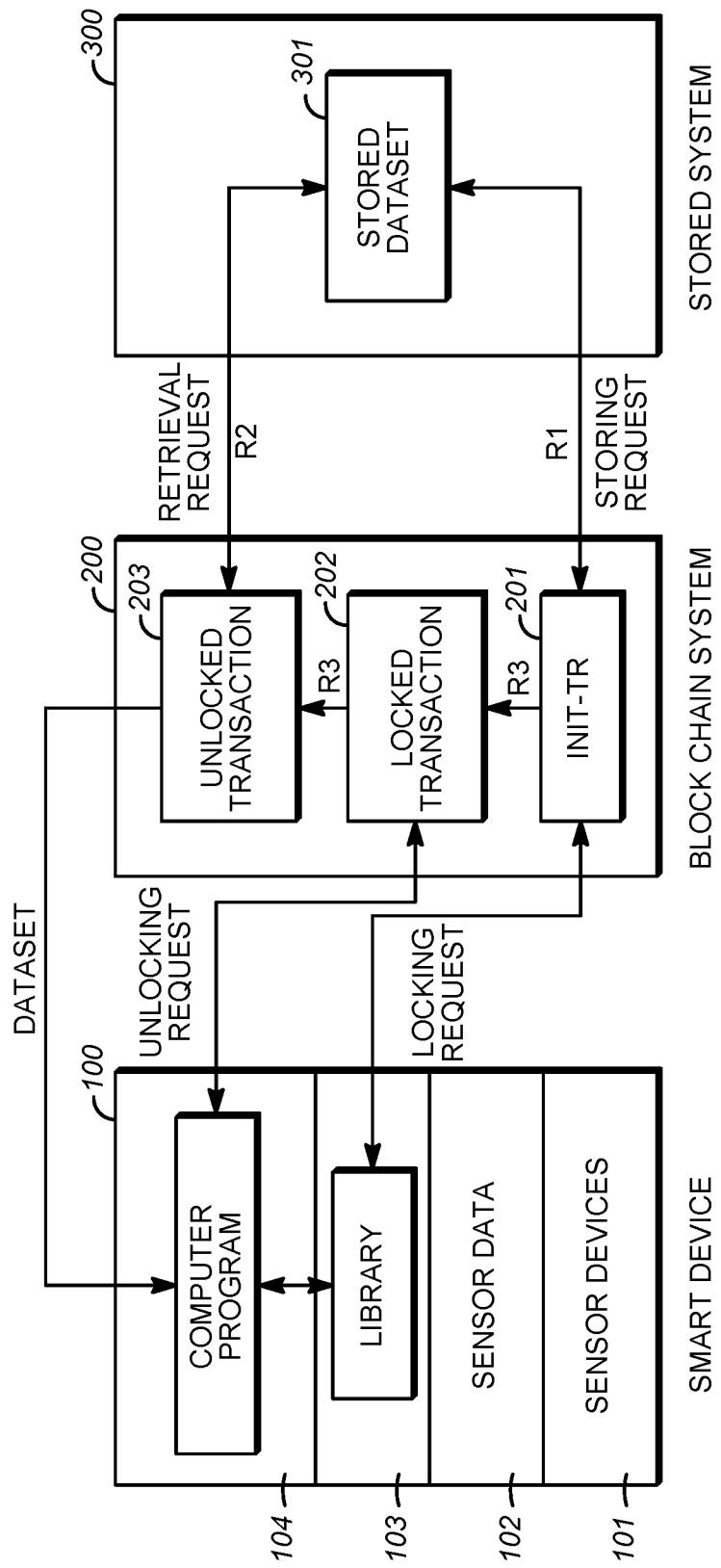
FIG. 1 shows one example of the functional architecture of a smart device and an access control system associated therewith for securely storing data in a storage system that may be located on the smart device.

Applications or software programs, sometimes referred to as "apps," may be personalized and their behaviors may be adapted in many ways. A large amount of prior art is concerned with using past historical data to build models of user behavior and to predict what users may want or like in given situations. In some situations, machine learning techniques have been used to predict user likes and actions. Such work may be characterized as being based on historical data of user actions. Moreover, applications that are adapted using such historical data have generally involved adaptations that personalize the services that are delivered to the user.

In some cases applications have used environmental and device sensor data. For example, location information derived from a mobile device is often used to provide product information and advertisements to a user. Such work may be characterized as being based on the state of the environment or the state of the user's device. Prior art contains a large amount of information on location-based services.

In one aspect, the present invention uses data that may be different from that used in the prior art. It may also use such data to derive different kinds of adaptations and not simply adaptations that personalize the services that are delivered to the user. In addition, such data may be stored in a secure manner so that it is only accessible to various applications with the express authorization of the user.

Consider a user who launches an application on a tablet computer that has a front-facing camera. As the user interacts with the application, the application running on the tablet observes that the user is smiling, e.g., by using the front-facing camera of the tablet computer. The application may then adapt itself, in a manner described below, corresponding to the observed user state. For example, if the user is observed to be making a number of typing mistakes while composing a message, he may be reminded of a feature by which he may use audio input, i.e., the application adapts its user interface to depict an icon indicating that audio input is acceptable.

Note that the data triggering the above exemplary adaptation comes directly from the user during the session with the application; the data is not related to a condition or state of his device, his environment or his past actions. Note, also that the adaptation causes a change in the user interface being presented to the user by the application.

Thus, one difference between adaptations discussed in prior art and the adaptations considered in the present invention is that the latter considers adapting elements of an application's user interfaces based on dynamically derived data from the user in some direct fashion. This distinction may be exemplified by considering location data. Typically, prior art derives location data by using the GPS transceiver installed in a number of mobile devices. It is commonplace then to associate the user with the derived location, i.e., the user is assumed to be in the location derived for his device. While that indeed may be true, it nevertheless, in many cases, may be an incorrect assumption. Factually, we have obtained sensor data that describes a state of the device but we assume that it equates to the user state.

In contrast, no such assumptions are necessary if the camera of a tablet or other smart device detects a user to be located at the Statue of Liberty Park on July 4. In this case, the user state is factual and not based on an assumption.

In particular, as stated above, the present invention makes a distinction between an environment state (e.g., the temperature where a device may be present), a device state (location of device, orientation of device (e.g., landscape or portrait), and a user state (e.g., user is smiling). Each of these states may be determined from sensor data obtained by sensors incorporated in or otherwise associated with a smart device, yet each provides a distinctly different type of data. Moreover, it may occur in some instances that a single sensor may provide more than one type of state information. For instance, a camera may provide both user state information and environment state information and possibly even user state information, environment state information and device state information.

A determination of a user state may lead to qualitatively different kinds of adaptations of an application. User state data obtained from sensors associated with a smart device may be used by the smart device to make inferences about one or more characteristics of the user such as his state of mind, physical condition and so on. For example, consider a user typing a message using a soft keyboard on his smart device. The soft keyboard application captures and analyzes various parameters of the user's typing style, e.g., the fingers he uses most often, which characters he types in error most often, which keys he hits in too rapid or in a slow fashion, the force with which the keys are pressed, etc. Analysis of such parameters may allow the application to make an inference concerning a characteristic of the user's behavior, mood and so on. For instance, the application may conclude that the user is in a hurry. Moreover, based on the analysis of the parameters, the application may adapt by, for example, adjusting the location and size of certain keys of the soft keyboard or the shape of the soft keys, determine that the user is in a hurry, etc. A user model may also be built that infers from these parameters that the user is left-handed and as a consequence it may adjust the layout of keyboard to better accommodate a left-handed person.

It is to be noted that the typing parameters are derived from data gathered by the application from sensors (in this case a user input device such as a soft keyboard) whilst the application is executing. That is, the data comes from the user himself, the data is analyzed locally and triggers one or more adaptations of the application's soft keyboard.

As another example of an application that adapts based on user state information obtained from sensors, consider an application playing a promotional video for a user. The application infers or otherwise determines from observations of the user that the user is getting restless or distracted (perhaps due to the length of the presentation). The application may then adapt its video rendering interface accordingly. For example, the user interface may be adapted to adjust the speed at which the video is being rendered. For instance, the video play rate may be increased by, say, a factor of 2 in an attempt to reduce the user's apparent restless behavior. It should be noted that the type of user state information that is obtained in this example is user reaction information. That is, the user is reacting to a function (e.g. video rendering), being performed by the application.

As yet another example, the application may analyze audio commands received from a user through a microphone associated with a smart device. The application may adapt its functionality based not simply on an understanding of the audio command, but also on inferences obtained from an analysis of the user's tone of voice, word choice, rate of speech, hesitation and so on. An analysis of this type may be used to infer that the user may be in a hurry, worried, angry, etc. Based on this analysis the application can change or otherwise adjust its user interface or some function that it performs. It should be noted that in this example the user state information does not necessarily reflect the user's reaction to a function being performed by the application. Rather, the user's state may be entirely independent of the application's performance.

Many, if not all, applications depend critically on their user interfaces. Indeed, a good user interface that is liked by the users may significantly contribute to the popularity of an application. Applications that do not have popular user interfaces can often suffer commercially.

It is thus important for an application to "get its user interface right" and many enterprises employ designers and user interface engineers with this maxim in mind. Being able to adapt elements of the user interface of an application based on a dynamically determined user state may thus be commercially valuable.

It should be noted that the adaptations of an application as discussed herein are not limited to adaptations of the user interface. More generally, user state information obtained by sensors, including user interface devices incorporated in or associated with a smart device, may be used by an application to change any functional aspect of the application's operation. For instance, in say, a gaming application, a character (e.g., an avatar) assigned to a user, a complexity level of the game and/or even the nature and type of game itself may also be determined in part by the user state information that is obtained.

In some instances, the user state information of a user as captured by the sensors of his smart device, e.g., his front-facing camera, may be stored and provided in a secure fashion to a trusted third party by the user himself.

In a different aspect, the present invention concerns who controls the data that is used to adapt a user interface or, more generally, a user experience. In prior art, the most common entity in control of user data (about device state, device environment, or user state) is the service provider. Most often, such data is stored in service provider controlled facilities. Even when the user data is stored on a user's device, e.g., as a cookie, it is controlled by the service provider and it is the provider that makes a decision on the usage of the cookie data. (The user's control may be limited to deleting cookies from his device.)

In some cases, the user provides explicit data, e.g., by typing in his password and credentials. Again, that data is stored by the service provider, in its facilities or on the user's device, but its use is up to the service provider.

In another aspect of the present invention all user data is controlled by the user who either explicitly or by programmatic policy allows authorized applications to access and use the data to adapt user interfaces and user experiences.

Many messaging systems store user generated content on a user's device. For example, Email systems store a user's prior messages that a user may then access and use subsequently. The user is also allowed to delete and edit his historical messages, i.e., the stored files. While it may be argued that the user is in control of his user generated content, the user generated content is not utilized to adapt the user interface or the user experience of the messaging system. The messaging system is assumed to have complete access to the stored data and the messaging system is not required to explicitly request the user to allow access to his messages.

Social networking systems allow users to generate and share user generated content. Again, user generated content, however, is not used by said systems to adapt user interfaces or user experiences. Also, the social networking application is assumed to have access to the user's content and no explicit access is requested to said content.

In one aspect of the present invention not only does an application need to request the user for access to his data, the user may allow multiple applications access to the same data. For example, a user may allow Facebook and Twitter to access the same cache of photos stored on his device.

In some embodiments of the present invention, the user data may be stored on a user device while the authorization, i.e., access control, methods are implemented and provided by third-party providers who, under direction of the user, allow one or more applications access to the user's data. When such access is allowed, the user data may be returned back to the user device (wherein the application is executing) and provided to the application that may then use the data for its adaptability efforts. In some embodiments, the returning of the user data may comprise returning the data to a specific memory location of the user's device that is conducive to access by one or more applications. In other embodiments, the returning process may comprise returning the data, in an obfuscated and anonymized manner, to a third party memory from whence it may be accessed by one or more applications. Alternatively, the data stored in the third-party memory may be "secure links" that refer one or more applications to the actual storage locations of the data. The term "secure links" implies that said links may only be used by entities that satisfy certain pre-determined security conditions.

In a different embodiment, the methods used to authorize one or more applications to access and utilize user data, may involve both third-party providers and special software logic running on a user's device.

In yet another embodiment, the authorization method may only involve software logic running on the user device.

The present invention proposes a system and method whereby data about a user may be collected by applications using various sensors available to smart devices used by the user. In general the user will be required to explicitly authorize the collection of such data. It is assumed that the user owns the data.

If a time period is not specified, once the user authorizes the collection of data, the data from the smart device of a user may be collected over time and made available to one or more selected applications. Alternatively, it may be collected and used when a particular application is launched, i.e., in real time.

Data so collected may be accessed by an application launched on a device of the user and the data may be used to make a determination of the state of the user. Such state determinations may then be used by the application to personalize its services, user interfaces and/or other functions that it may perform. However, it should be re-emphasized that the application must request permission to access the data from the user. The user may grant such a request explicitly and, furthermore, restrict it to a specific time period.

Thus, it may be assumed that an application running on a smart device of the user may adapt its internal components based on the state of the user. In a sense we may say that the application adapts itself to the state of the user.

Several factors distinguish the kind of adaptations considered by the present invention. First, the application adapts its own internal components, e.g., its user interfaces. Secondly, the data used to trigger the adaptation is owned and is provided by the user of the application. It is not provided from a server owned by the enterprise providing the application or a third party. Finally, the user data concerns the state of the user, e.g., his actions, and not the state of his devices or his environment.

Illustrative Embodiments

Exemplary embodiments of the present invention include applications that are downloaded from an app store as well as other sources. Moreover, such applications may be native or third party applications or even applications that are in whole or in part cloud-based. Examples of such applications are messaging applications such as text messaging applications, video messaging apps and chat apps. Video rendering apps, apps used to compose text messages, shopping and e-commerce apps, etc., are other exemplary applications.

A smart device is a device with a processor and one or more fixed or wireless network connections, input and output devices such as displays, keyboards (soft or conventional physical keyboards), etc. The smart device may or may not incorporate sensors such as accelerometers, imaging sensors (e.g., cameras) and proximity sensors that may detect and provide data on motion, etc. Alternatively, or in addition to such sensors, the smart device may have access to data from sensors via a short-range wired or wireless connection using, for example, a USB, Bluetooth or near-field communication (NFC) interface.

Examples of smart devices include mobile devices and non-mobile devices. Examples of smart devices that are mobile include smartphones, tablet computers, Personal Digital Assistants (PDA), mobile phones and mobile terminals. Such mobile devices are sometimes equipped with an integrated camera with a front-facing orientation that may be configured by an Application Programming Interface (API) or by explicit user commands. Such an integrated camera may be conveniently used to provide applications with user state information.

The present invention provides a system and methods by which an application may selectively adapt itself based on state information of its user. The state information of the user of the application are computed from data collected from the sensors of the smart device of the user.

In one aspect of the present invention the user state information used to adapt an application is kept private in the sense that it is owned by the user, stored at the request of the user and access to it is granted by the user to a specific entity.

In one embodiment, one component of the invention comprises special Software Control Logic (SCL), e.g., a software library, that runs on a user's smart devices. The SCL interfaces with the sensors of the smart device or the data collection procedures of the smart device to get access to sensor data.

A functional architecture of one example of a smart device 100 is shown in FIG. 1. One or more sensor devices 101 produce sensor data that may be stored in registers 102. SCL 103 may read the sensor data in registers 102. SCL 103 may also read the sensor data by directly accessing the sensor devices 101 by utilizing pre-determined and pre-configured application programming interfaces.

A computer program 104 runs on smart device 100. By way of example, 104 may be the result of downloading an application from a suitably configured app store.

SCL 103 (FIG. 1) aggregates and processes the sensor data from 101 and/or 102 and creates a Sensory Dataset (SD) that it stores in a Storage System 300, access to which is controlled in some fashion so that it can only be accessed by an authorized application. In one embodiment presented herein for purposes of illustration the access control mechanism is Block Chain System 200. Any entity, including the computer program 104, wishing to access the dataset SD needs to be authorized by the Block Chain system 200. The methods by which SD may be stored and accessed, i.e., details of the authorization process, are described below.

As a general explanation, we may describe the Block Chain System 200, as a collection of computers, with a universal clock mechanism, which authorizes entities requesting access to datasets that may be stored on a smart device that is able to communicate with the Block Chain System 200. Thus, a specially configured computer program running on any general purpose computer may be used for authorization purposes. We describe the authorization functions by recourse to a particular kind of collection of computers, viz., Block Chain system of computers. A Block Chain system of computers executes two special types of instructions called locked and unlocked transactions. A locked transaction can only be executed if certain specific input data values are provided by a requesting entity. An unlocked transaction may be executed at the request of any entity, i.e., its locks may be considered to be open by default. In other words, an unlocked transaction may be considered to be a limiting, i.e., degenerate, case of a locked transaction.

A software lock is a software function that takes a certain number of inputs with specific values and returns the answer "true/false". As long as the input values to a lock remain unspecified or are incorrect, it is considered as being locked. If the required input values are provided and the lock evaluates to "true", it is said to be unlocked. If input values are specified and the lock evaluates to "false", i.e., the input values are incorrect as per the specification of the lock, the lock is deemed to remain locked.

Consider the situation described as follows.

Lock L comprises a function F with required input values X, Y, etc. A software operation R is locked by the said lock. We may depict such a situation as follows.

Lock L: [Function F (X, Y, . . . ); Operation R]

"R" may include one or more operations; it is a piece of software logic. The lock L "guards" the operation R until input values X, Y, . . . is provided such that the function "F" evaluates to "true". The operation "R" may then be executed.

Figure 2:
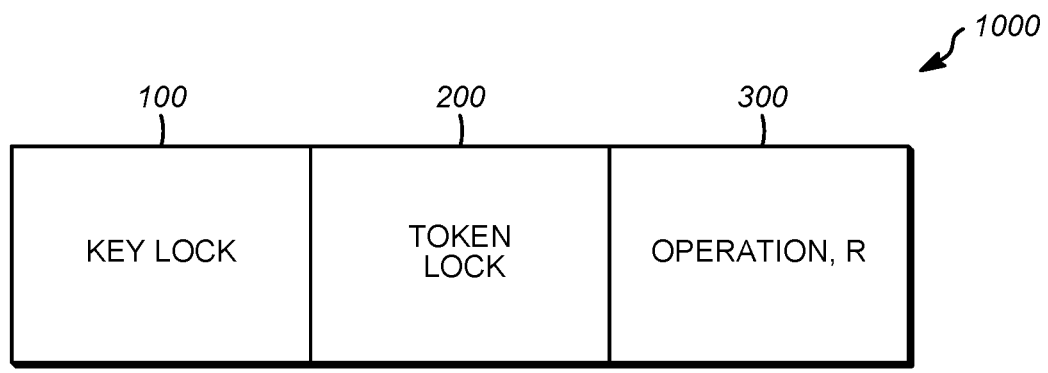
FIG. 2 illustrates a series of locks that may be used to safeguard an operation "R."

Imagine a computing entity wishing to protect or safeguard an operation, R. As depicted in FIG. 2, it creates a series of locks 100-200 to safeguard said operation "R" 300. The locks are described as follows.

Key Lock: The lock requires a requesting entity to provide a "private key" that will unlock the lock. Only a particular private key will "fit" the given lock.

Token Lock: The lock requires that a requesting entity provide a specific "token" to unlock the lock; only a specific token will fit and, hence, open the lock.

FIG. 2 shows an exemplary operation "R" 300 that is locked by two locks Key Lock 100 and Token Lock 200. An entity must open the locks 100 and 200 before it may request that the operation "R" be executed. The software object comprising the locks 100 and 200 and the guarded operation "R" 300 may be said to be an exemplary locked transaction 1000.

A Block Chain System (cf. 200, FIG. 1) may be thought of as a collection of computers that execute locked transactions of the form 1000. That is, locked transactions are stored in specific registers of the Block Chain System 200. A requesting entity may provide input data values and request that a specific locked transaction be executed. If the input data values succeed in opening the locks of the locked transaction, the Block Chain System may then execute the guarded operation "R" that is being protected by the locks of the transaction. In certain cases, a locked transaction may, additionally, create one or more other locked transactions that are to be executed at a later clock cycle, i.e., it is assumed that the Block Chain System has an internal universal clock.

The operation "R" represents three specific kinds/types of operations as considered in this presentation. First, "R" may represent an instruction denoted "R1" to store a dataset in Storage System 300 (FIG. 1). Second, "R" may represent an instruction denoted "R2" to retrieve a stored dataset from Storage System 300. Finally, "R" may represent an instruction denoted "R3" to write a specific and new locked transaction into its registers for execution at a later clock cycle. A particular locked transaction may specify one or more data operations R1, R2 and R3.

Returning now to the example described in FIG. 1, SCL 103 constructs a dataset called SD as described earlier. It wishes to store SD 301 in storage system 300 that is largely conventional. System 300 supports specific dataset storage and retrieval operations such as "R1" and "R2".

SCL 103 requests Block Chain System 200 to execute a pre-determined and pre-configured transaction 201. Transaction 201 is a locked transaction whose locks can be opened by any entity. That is, the locks may be opened by an entity by providing any input values. Transaction 201 performs two operations R1 and R3. First, it takes as input a dataset and stores it in Storage System 300 using operation R1. Second, using operation "R3" it writes a new transaction 202 that contains a token lock, a key lock and the operation "R3". Block Chain System 200 stores the recently created locked transaction 202 in its log files for use in a later clock cycle.

Computer program 104 seeking access to SD must specify input data values to the transaction 202 that will open its locks. When unlocked, transaction 202, using "R3", creates an unlocked transaction 203 containing operation "R2". In a later clock cycle, the unlocked transaction 203 may be executed; no input data values are needed for its execution since it is unlocked. Its execution results in the return of the dataset SD to the computer program 104.

In summary, transaction 201 uses "R1" to store the dataset and uses "R3" to write locked transaction 202 (locking "R3"). Transaction 202 is unlocked by providing a suitable private key and a suitable token. When unlocked it creates an unlocked transaction 203 containing operation "R2" that may be executed to retrieve the stored dataset.

We now describe how SCL 103 FIG. 1 may collect data about e.g., a user's facial features by using the front-facing camera of the user's smart device. Of course, other types of sensor data may be collected by the SCL 103 using the same process.

Figure 3:
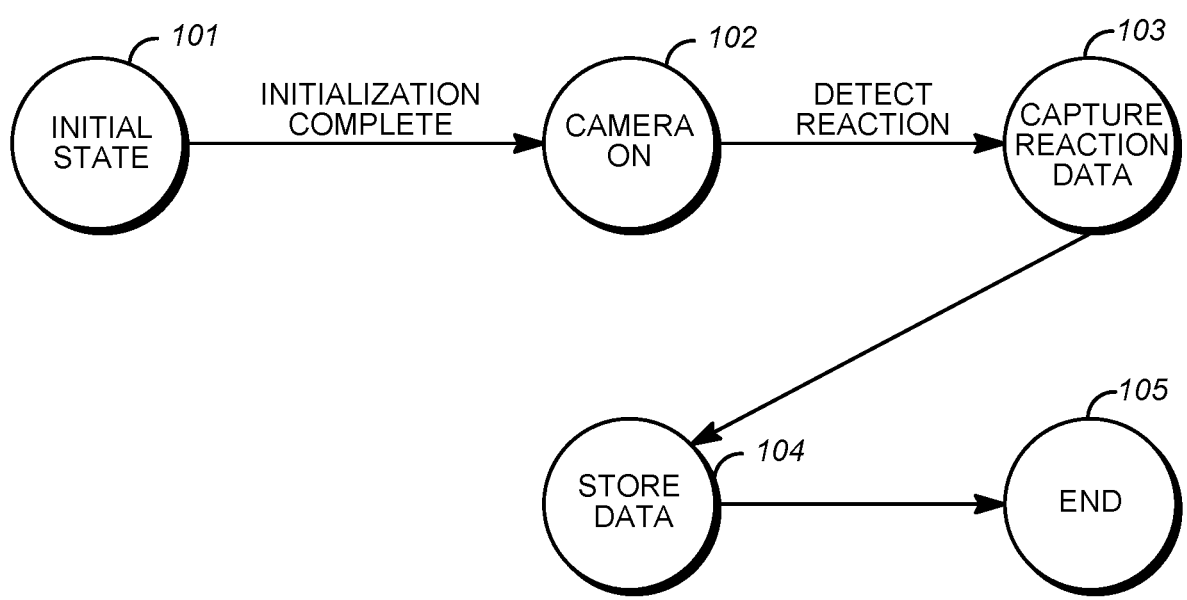
FIG. 3 depicts one example of a state machine that represents the software application residing on the smart device shown in FIG. 1.

A user launches an application 104 that activates SCL 103 (cf. FIG. 1). FIG. 3 depicts an exemplary state machine that represents application 104 and utilizes the SD dataset as collected by SCL 103.

In state 101 the state machine is in an initial state awaiting the completion of the initialization phase. Upon completion of initialization, the state machine enters state 102 wherein the internal camera of the message receiving device is turned on. Upon detecting a user reaction, the state machine enters state 103 wherein the user's reaction data is captured.

Continuing with the above example, state 103 causes the dataset to be stored in Storage System 300 (FIG. 1) by asking the Block Chain System 200 to execute transaction 201. As described above, 201 stores the dataset 301 and creates locked transaction 202 (FIG. 1).

We now describe how the SD data collected by SCL 103 may be used by a computer program such as 104 (FIG. 1). (In practice, program 104 will most likely be one component of a larger application.) Program 104 unlocks the locked transaction (202, FIG. 1) that creates unlocked transaction 203 that, when executed retrieves the stored dataset SD 301.

Figure 4:
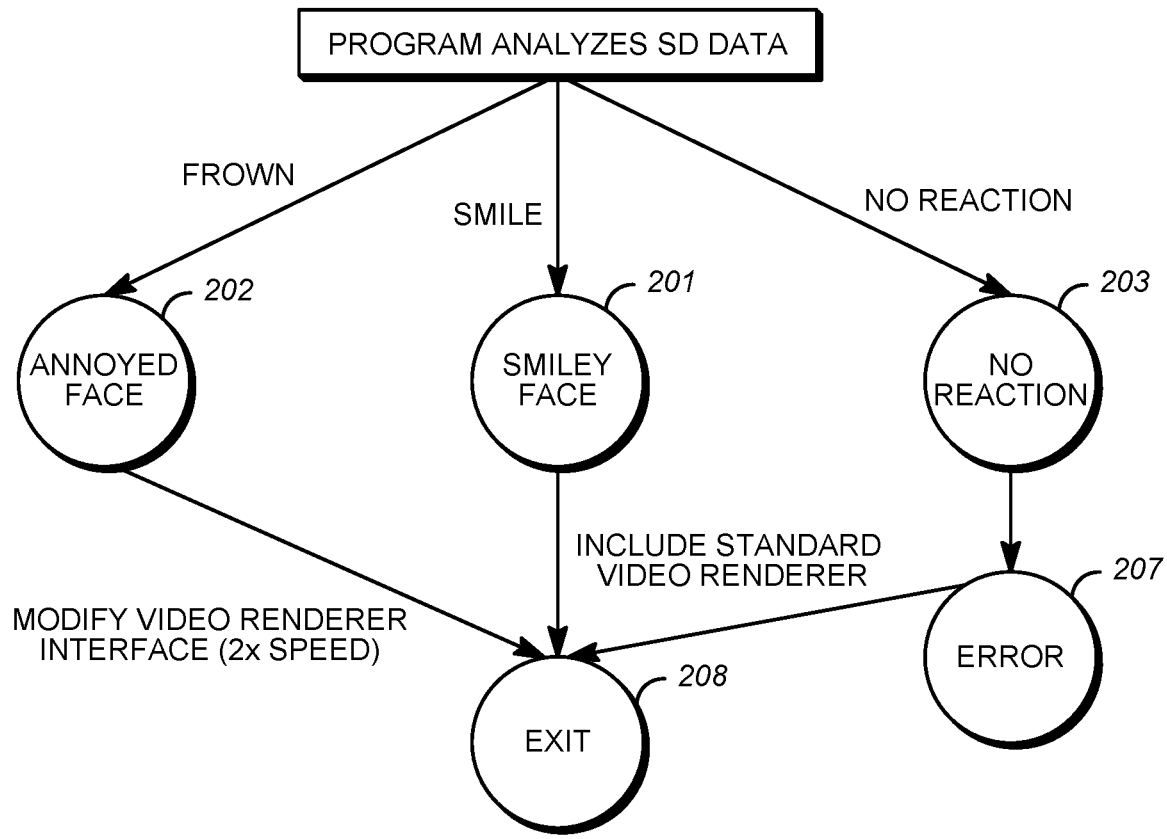
FIG. 4 shows one example of an analysis of a dataset that may be performed by the software application residing on the smart device shown in FIG. 1.

FIG. 4 shows an exemplary analysis of the dataset SD by a program such as Program 104. Assume the analysis may result in one of three actions: smile detected (state 201), frown detected (state 202), no feature detected (state 203). State 201 directs the software logic to adapt the user interface to include a general video rendering control element. State 202 directs that the user interface is to be adapted to contain a special renderer that only plays "short" versions at 2× speed. State 203 transitions to state 207 wherein an error report is created. The logic of the state machine terminates in state 208.

General Method Lock Transaction

We now describe the general method of creating locked transactions. Entity "A" (e.g., SCL 103) wishes to store a dataset SD with a locked data retrieval operation "R" so that it may only be opened by entity "B" (e.g., computer program 104).

Entity "B" creates a private-public key pair (Pri_B and Pub_B, respectively. (Initialization Step)
"B" sends Pub_B to entity "A". (Initialization Step)
Entity "A" locks "R" using Pub_B.
Entity "A" creates a pair of unique tokens (T1, T2), possibly time-based.
Entity "A" locks "R" using token "T1".
Entity "A" requests Block Chain System to execute Init-Tr 201 (FIG. 1) that stores the dataset SD 301 in Storage System 300.
Note: Init-Tr 201 is a pre-determined and pre-configured transaction initially available to all entities.
Init-Tr 201 (FIG. 1) creates locked transaction Tr=[Lock T1: Lock Pub_B: operation R] 202 and stores it in its registers.

General Method Unlock Transaction

Entity "B" wishes to unlock "202 (FIG. 1)" so that it may access the SD dataset.

Entity "B" requests "A" for a token.
Entity "B" receives token "T2".
Entity "B" provides [T2: Pri_B] to unlock the locked transaction 202. The unlock request must be received within the time constraint, if any, set by the locking transaction.
Entity "B" uses the token and its private key to unlock transaction 202.
Transaction 202 creates unlocked transaction 203.
Transaction 203 when executed at a later clock cycle retrieves dataset SD.

Thus, SCL 103 FIG. 1, uses the following method to lock SD dataset.

Initialization Step: User launches an application.
Initialization Step: SCL 103 asks for user permission, listing application that will be granted access.
Initialization Step: User permits access, possibly with time period limitations.
Initialization Step: SCL 103 uses public key of application to create lock.
Initialization Sep: SCL creates time-based Token lock for said application.
SCL collects data, creates SD dataset and requests Block Chain to execute pre-determined and pre-configured transaction Init-Tr that stores SD in Storage System 300.
Init-Tr creates a locked transaction 202 using the token and public keys as above.

The computer program 104 FIG. 1 gains access as follows.

Program 104 asks SCL 103 for the token.
Program 104 has its own private key, Pri_104.
Program 104 unlocks 202 using input data values [T: private key Pri_104].
Transaction 202 creates unlocked transaction 203.
Transaction 203 retrieves dataset 301.
Program 104 analyzes data and adapts its actions accordingly.

Note that the dataset SD is locked using a special time-based token and the public key of the requesting program 104 in an initialization step. A time-based token is only good for a certain amount of time. At run time, program 104 asks and receives the matching token from SCL 103 that it uses, along with his private key, to unlock a locked transaction and gain access to the SD dataset. The access provided to program 104 is only valid during the time period specified by the locking conditions.

Thus, access is granted to a specific application by a user for a given time period only, e.g., while the application is running on his smart device. Once the application finishes execution, or the time period elapses, the access is no longer possible. That is, the data operation is locked. Therefore, access to the user's data is limited only to authorized applications while they are running on his device and when explicitly given permission. The Block Chain system, as is well-known in prior art, does not allow unauthorized accesses.

In a possible vulnerability, the application having received the dataset SD legitimately, may indulge in an illegal activity, e.g., it may transmit the SD dataset to a server. The user may protect against such illegal actions by explicit actions, e.g., he may run said application whilst the device has no external network connections.

Even if the user fails in protecting his data from such illegal actions by an application, it is claimed that such behavior by applications will ultimately render them unfavorable amongst the user community.

Note that as is well-known in prior art of public key cryptography, only compatible pairs of private and public keys may be used to match each other. This property of keys underlies the well-known feature of digital signatures.

Note also that a token lock is needed to ensure that only a dataset provided by a specific SCL function may be accessed. No other datasets stored by programs claiming to be "SCL" entities are considered legitimate.

It is important to note that the functions performed by the Block Chain System 200 of FIG. 1 are based on public key cryptography and token-based authorization mechanisms. As such, they can be expressed as computer programs and executed on any conventional processor or any general purpose computer.

Another illustrative use case concerns information that may be provided by a user's web browser to a web site. Such information, some of which may conventionally be provided through cookies, may be stored so that it is only accessible to the web site using the access control methods described herein. Likewise, additional information that the web site may conventionally maintain about the user such as his preferences and the like may be stored by the user and made available to the web site upon receiving the user's express authorization. For instance, a web site such as Amazon that currently maintains a user's preferences for, say, certain types of books, may instead be required to obtain the user's preferences using the techniques described herein.

Yet another illustrative use case in which user state information may be used relates to situations in which users are explicitly asked for their reviews, feedback or comments on products, and other common scenarios. Certain applications request users to rate content, express approval, likes, dislikes, fill out online surveys, etc. Broadly speaking, input from a user may be used to attract other people to certain content. For example, reviews of a movie or a restaurant may be used to attract other users to view the movie or visit said restaurant. A website may use likes and dislikes expressed by users to filter and adjust its own content. Thus, user feedback and input may be quite useful in personalizing content. For this reason many enterprises are interested in capturing real-time responses of consumers. An enterprise may wish to see the reaction/response of a consumer to a particular online offer or a rebate program. Another enterprise may wish to see how users react to a video message. However, responses and reactions may be quite different if captured in real-time, i.e., "in the moment", or recorded after the event or occurrence. However, asking users to take time to review content may be problematic and may elicit few responses or even, in some cases, negative responses.

Given the capabilities of modern smart devices such as video, audio and motion capturing components, it is a relatively simple matter to construct applications that trigger one or more smart device components such front-facing camera to capture in the moment reactions or responses of users. In this respect, manufacturers often provide appropriate application programming interfaces that help developers control various components of smart devices.

The problem then shifts to the use of the captured response/reaction data, i.e., the privacy concern. In this regard, the various embodiments described above teach that the data may be captured and stored using only the "public key" of a user. Thus, the identity of the user is unknown and cannot be associated with the public key.

Another possible concern of users with the publication or use of reaction/response data is that certain features of the data may be used to identify the user, e.g., his video images or the sound of his voice. In this regard the present invention envisages the use of avatars and audio muffling techniques to anonymize the captured data.

The illustrative embodiments have largely focused on applications that run on a smart device of the user. However, in practice, cloud-based applications, i.e., applications that execute in a cloud based server system and render their results on a smart device may also be subjects of the present invention. The only requirement imposed by the present invention is that the data collecting software logic, the SCL, be resident on the smart device.

The various illustrative embodiments described above teach that data is collected by the SCL, stored using a locking transaction and is then made available to an application. It is important to note that the entire process above is assumed to occur within the duration of a single session, i.e., the time interval within which the application is launched and then terminated. The time parameter of the lock controlling access to the data may be set by the user to an interval smaller than the session interval or set by default to be equal to the session timer.

In other embodiments, the user may be allowed to set the time parameter to a time interval of arbitrary length. In this case, the data is collected by the SCL, locked and stored and may be made available to an application on a historical basis.

The present invention envisages that the Storage System described in the illustrative embodiments may be preferentially implemented in the memory of the smart device itself. In this regard it is worth noting that present day smart devices may be configured to hold storage memories in excess of hundreds of gigabytes. Such a preferential implementation will add to the sense of security of the user about his data since the device will be in his physical possession.

In some embodiments the private key and token components generated and used in locks as described above are preferably stored in a secure manner in the user's smart device.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 5:
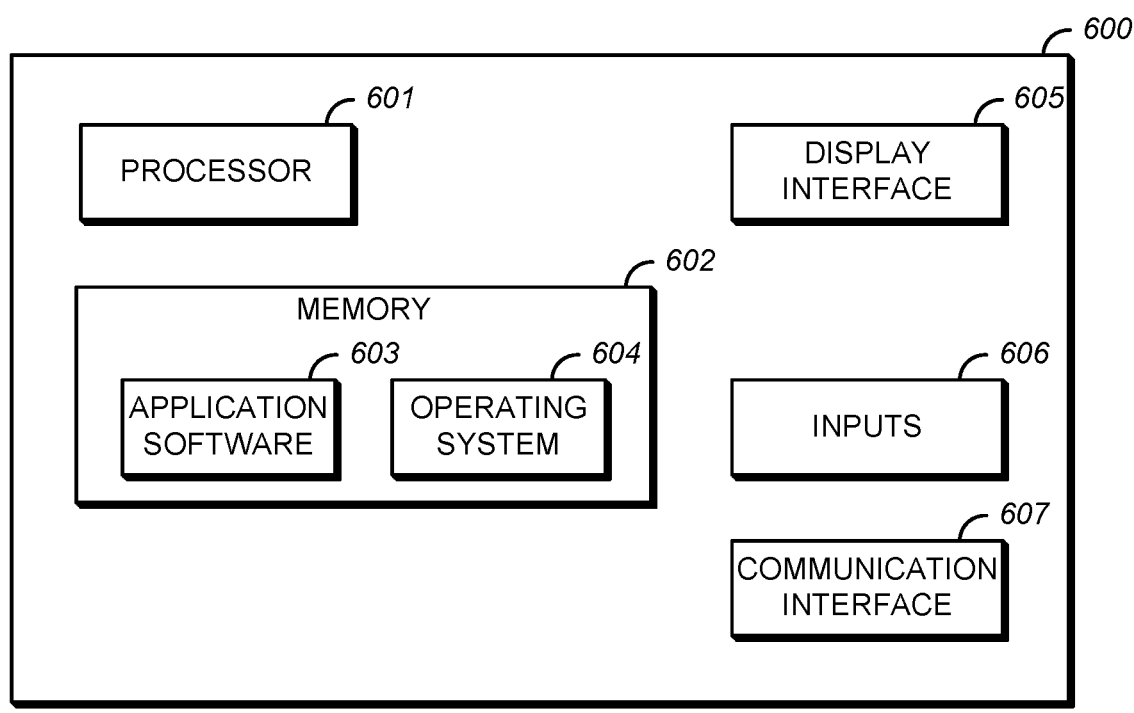
FIG. 5 illustrates various components of an illustrative computing-based device such as the smart device shown in FIG. 1.

FIG. 5 illustrates various components of an illustrative computing-based device 600 which may be implemented as any form of a computing and/or electronic device, and in which embodiments of the smart device 100 or a portion of the block chain system 200 as described above may be implemented.

The computing-based device 600 comprises one or more inputs 606 which are of any suitable type for receiving media content, Internet Protocol (IP) input, activity tags, activity state information, resources or other input. The device also comprises communication interface 607 to enable the device to communicate with one or more other entity using any suitable communications medium.

Computing-based device 600 also comprises one or more processors 601 which may be microprocessors, controllers or any other suitable type of processors for processing computing executable instructions to control the operation of the device in order to provide a search augmentation system. Platform software comprising an operating system 604 or any other suitable platform software may be provided at the computing-based device to enable application software 603 to be executed on the device.

The computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 605 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Having thus described several aspects and illustrative embodiments, it is to be appreciated that various alterations, modifications, and improvements will readily occur to those skilled in the art. Such alterations, modifications, and improvements are intended to form a part of this disclosure, and are intended to be within the scope and spirit of this disclosure. While some examples herein presented specific combinations of functions or structural elements, it is to be understood that those functions and elements may be combined in other ways according to the present disclosure to accomplish the same or different objectives. In particular, it is not the intent of the above descriptions to exclude or limit the elements and features discussed in connection with an embodiment to that embodiment or that role.

Additionally, elements and components described herein may be utilized or arranged to achieve performance, operational and efficiency gains.

Accordingly, the foregoing descriptions are by way of example only, and are not intended to be limiting.

What is claimed:

1. A method for customizing an application for a user, comprising:
   receiving from one or more sensors associated with a smart device user state information about a user of the smart device;
   storing the user state information using an access control mechanism that only allows access upon express authorization of the user, wherein the access control mechanism includes a block chain system for executing a locked transaction arrangement that stores user state information, wherein the locked transaction arrangement storing the user state information uses a plurality of locked transactions established by the block chain system, each locked transaction preventing retrieval of the stored user data information unless one or more prescribed input values are received; and
   retrieving the stored user state information after an application being executed on or through the smart device has been provided with the express authorization from the user; and
   adapting functionality of the application based at least in part on the user state information that is retrieved.

2. The method of claim 1, further comprising inferring one or more characteristics of the user based at least in part on the user state information, wherein adapting the functionality of the application includes adapting the functionality of the application based at least in part on the inferred characteristics.

3. The method of claim 1, wherein the functionality being adapted is the functionality of the user interface of the application.

4. The method of claim 3, wherein the user interface functionality being adapted is a configuration of a user input interface.

5. The method of claim 3, wherein the user interface functionality being adapted is a manner in which output is delivered to the user.

6. The method of claim 2, wherein the one or more characteristics being inferred includes a user reaction to a function being performed by the application.

7. The method of claim 1, wherein the user state information is received only while the application is being executed on or through the smart device.

8. The method of claim 2, wherein the one or more characteristics of the user includes a mood of the user.

9. The method of claim 1, wherein one of the locked transactions is locked with a time-based token that only allows the locked transaction to be unlocked for a prescribed period of time.

10. The method of claim 9, wherein the prescribed period of time only occurs during a runtime of the application.

11. The method of claim 9, wherein the prescribed period of time only occurs during a single runtime session of the application.

12. A method for customizing an application for a user, comprising:

receiving from one or more sensors associated with a smart device user state information about a user of the smart device;

storing the user state information using an access control mechanism that only allows access upon express authorization of the user, wherein the access control mechanism includes a block chain system, wherein storing the user state information includes storing the user state information using one or more locked transactions established by the block chain system, each locked transaction preventing retrieval of the stored user data information unless one or more prescribed input values are received, wherein the one or more locked transactions established by the block chain system includes a plurality of locked transactions, one of the locked transactions being locked with a time-based token that only allows the locked transaction to be unlocked for a prescribed period of time; and retrieving the stored user state information after an application being executed on or through the smart device has been provided with the express authorization from the user; and adapting functionality of the application based at least in part on the user state information that is retrieved.

13. The method of claim 12, further comprising inferring one or more characteristics of the user based at least in part on the user state information, wherein adapting the functionality of the application includes adapting the functionality of the application based at least in part on the inferred characteristics.

14. The method of claim 12, wherein the functionality being adapted is the functionality of the user interface of the application.

15. The method of claim 14, wherein the user interface functionality being adapted is a configuration of a user input interface.

16. The method of claim 14, wherein the user interface functionality being adapted is a manner in which output is delivered to the user.

17. The method of claim 13, wherein the one or more characteristics being inferred includes a user reaction to a function being performed by the application.

18. The method of claim 12, wherein the user state information is received only while the application is being executed on or through the smart device.

19. The method of claim 13, wherein the one or more characteristics of the user includes a mood of the user.

20. The method of claim 12, wherein the prescribed period of time only occurs during a runtime of the application.

21. The method of claim 12, wherein the prescribed period of time only occurs during a single runtime session of the application.

* * * * *